United States Patent Office.

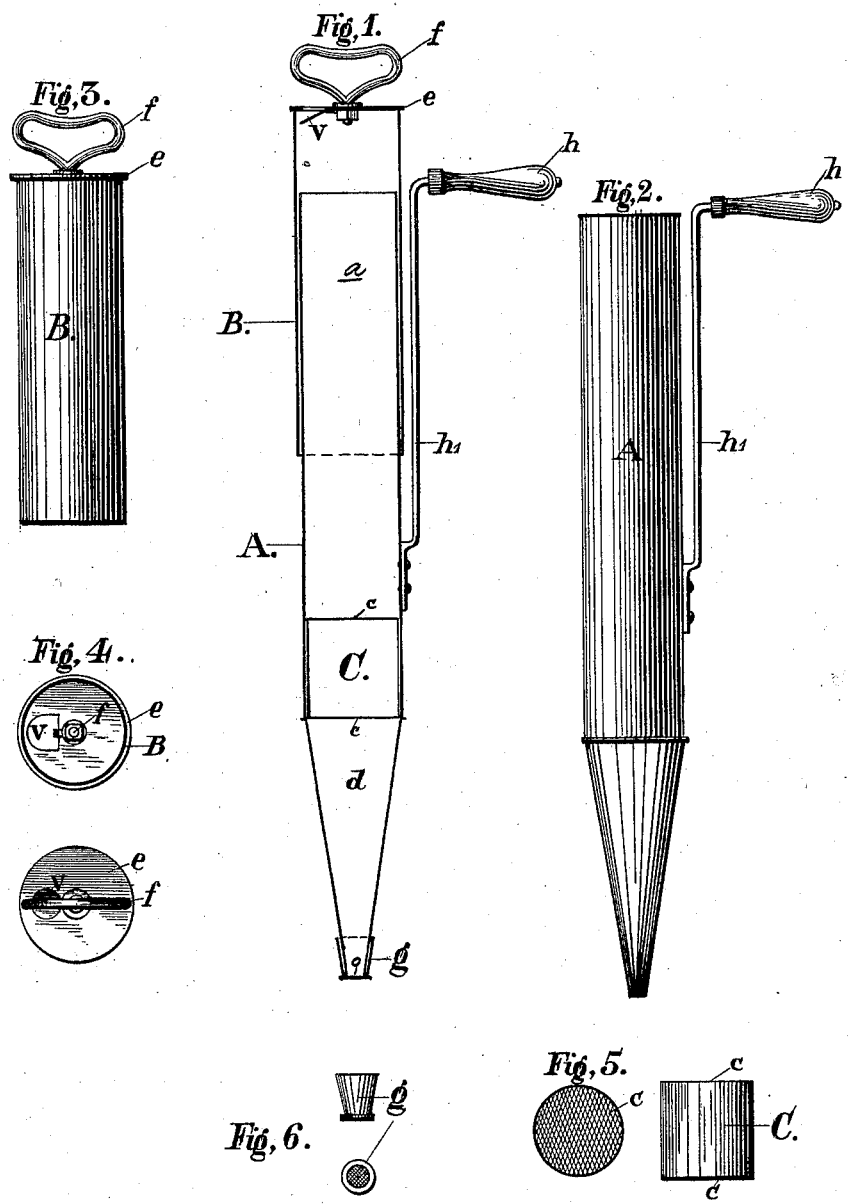

CHARLES MEEKER, OF ALBINA, OREGON.

VERMIN-ERADICATOR.

SPECIFICATION forming part of Letters Patent No. 365,930, dated July 5, 1887.

Application filed April 20, 1887. Serial No. 235,565. (No model.)

*To all whom it may concern:*

Be it known that I, CHARLES MEEKER, a citizen of the United States, residing at Albina, in the county of Multnomah and State of Oregon, have invented a new and useful Vermin-Eradicator, of which the following is a specification.

My invention relates to improvements in the extermination of vermin or underground animals by means of sulphur or any acid smoke created in the vermin-eradicator and forced into holes used as shelter for animals, or blown over plants, &c., by the same wherever vermin are to be eradicated. I attain these objects by the mechanism illustrated in the accompanying drawings, in which—

Figure 1 is a vertical section of the entire machine, with the outer cylinder pulled out about three inches. Fig. 2 is the inner cylinder. Fig. 3 shows the outer cylinder. Fig. 4 is a top and bottom view of the outer cylinder. Fig. 5 shows the inserted chamber with its wire-screened bottom and top covers. Fig. 6 is the protective ferrule over the outlet of the inner cylinder.

The entire machine consists, mainly, of the inner cylinder, A, the outer cylinder, B, and the inserted chamber C. These parts can be manufactured out of cast-iron or other metal, as well as of sheet or galvanized iron. The inner cylinder, A, is open at the top and tapers down into cone $d$, with outlet-hole $o$ in its end, similar to the shape of a syringe. The cylinder A holds in its upper chamber, $a$, the material to be ignited—as shavings, wool, or rags saturated with acid, &c.—thus rendering the necessary smoke injurious to vermin and smaller underground animals—as rats, &c. This ignitible material rests on chamber C, the top and bottom of which is covered with wire-screen or perforated plate $c$.

The object of chamber C, with its wire-screened top and bottom piece, $c$, is to cause the smoke to discharge cool, so as to prevent any injury by too much heat to growing trees or shrubs that are affected by or with any kind of vermin; also, to prevent the escape of fire from inner cylinder A, thereby rendering the use of the machine safe in and around any building which may contain any combustible material. The chamber C fits exactly into the inner cylinder, A, and finds a natural resting-place on the base of cone $d$. As chamber C is not fastened stationary onto the inner cylinder, A, it can easily be taken out for cleaning.

A handle, $h$, is fastened to the outer surface of inner cylinder, A, by means of a piece of flat iron, $h'$, bent at its base at right angles, so as to allow the outer cylinder, B, to slide over inner cylinder, A, without interfering with the handle-holder $h'$. The outer cylinder, B, fits exactly over the inner cylinder, A, and is covered at its upper end. This cover $e$ is fastened stationary to cylinder B, and is provided with an ordinary valve, $v$. Thus, when the outer cylinder, B, is drawn up by means of handle $f$, while the other hand holds handle $h$, the valve $v$ opens and allows the air to enter the cylinders B and A. When the outer cylinder, B, is pushed down, the accumulated air closes valve $v$ and forces the injurious smoke through the chamber C and cone $d$ out of hole $o$. The outlet-hole $o$ can also be protected against any escaping cinders, &c., by ferrule $g$, covered with screen of wire, thus forming an additional chamber in cone $d$, if deemed necessary, by applying the machine in or about any building.

I am aware that prior to my invention vermin exterminators or eradicators have been made with inner and outer cylinders. I therefore do not claim such a combination broadly; but What I do claim as my invention, and desire to secure by Letters Patent, is—

1. The combination, in a vermin-eradicator, with the cylinder A, formed at one end with a cone, $d$, of the outer cylinder, B, sleeved on the cylinder A, and the chamber C, removably inserted in the inner cylinder and supported by the base of the cone $d$, substantially as described.

2. The combination, in a vermin-eradicator, with the cylinder A, formed at one end with a cone, $d$, and the chamber C within said cylinder, of the outer cylinder, B, sleeved on the cylinder A, and provided with a cover, $e$, and handle $f$, and the flap-valve $v$ in said cover, substantially as and for the purpose specified.

3. The vermin-eradicator described, consisting of the chamber A, formed at one end with a cone, $d$, and provided with a handle, the chamber C within the said cylinder, and provided with perforated top and bottom, the removable ferrule $g$ over the end of said cone, the outer cylinder, B, sleeved on the cylinder A and provided with top $e$ and handle $f$, and the flap-valve $v$ in said top, all substantially as shown and described.

CHARLES MEEKER.

Witnesses:
A. OHLHOFF,
ADOLPH NICOLAI.